United States Patent
Anand et al.

(10) Patent No.: US 9,996,382 B2
(45) Date of Patent: Jun. 12, 2018

(54) IMPLEMENTING DYNAMIC COST CALCULATION FOR SRIOV VIRTUAL FUNCTION (VF) IN CLOUD ENVIRONMENTS

(71) Applicant: International Business Machines Corporation, Armonk, NY (US)

(72) Inventors: Manu Anand, Hyderabad (IN); Charles S. Graham, Rochester, MN (US); Timothy J. Schimke, Stewartville, MN (US)

(73) Assignee: International Business Machines Corporation, Armonk, NY (US)

( * ) Notice: Subject to any disclaimer, the term of this patent is extended or adjusted under 35 U.S.C. 154(b) by 253 days.

(21) Appl. No.: 15/089,427

(22) Filed: Apr. 1, 2016

(65) Prior Publication Data

US 2017/0286145 A1 Oct. 5, 2017

(51) Int. Cl.
*G06F 9/455* (2018.01)
*G06F 13/42* (2006.01)
*G06F 13/38* (2006.01)
*G06F 13/10* (2006.01)

(52) U.S. Cl.
CPC ........ *G06F 9/45558* (2013.01); *G06F 13/105* (2013.01); *G06F 13/387* (2013.01); *G06F 13/4282* (2013.01); *G06F 2009/45579* (2013.01)

(58) Field of Classification Search
CPC .. G06F 9/45558; G06F 13/105; G06F 13/387; G06F 13/4282; G06F 2009/45579
See application file for complete search history.

(56) References Cited

U.S. PATENT DOCUMENTS

| | | | |
|---|---|---|---|
| 6,910,024 B2 | 6/2005 | Krishnamurthy et al. |
| 6,968,323 B1 | 11/2005 | Bansal et al. |
| 7,739,153 B1 | 6/2010 | Anderson et al. |
| 7,743,001 B1 | 6/2010 | Vermeulen et al. |

(Continued)

FOREIGN PATENT DOCUMENTS

| | | |
|---|---|---|
| EP | 2283429 | 7/2015 |
| WO | 2010/099407 | 7/2015 |

OTHER PUBLICATIONS

Disclosed anonymously (2014). "Method to operate a fibre channel point to point topology in a virtualized environment." IPCOM000238427D, pp. 1-5. ip.com.

(Continued)

*Primary Examiner* — Eric Oberly
(74) *Attorney, Agent, or Firm* — Joan Pennington

(57) ABSTRACT

A method, system and computer program product are provided for implementing dynamic cost calculation for a Single Root Input/Output Virtualization (SRIOV) virtual function (VF) in cloud environments. A management function periodically queries the SRIOV adapter for activity statistics for each assigned virtual function. The management function builds a usage heuristic based on the resource usage statistics. The management function calculates dynamic cost for the SRIOV VF based on the resource usage statistics. Calculated dynamic costs for the SRIOV VF are provided to a virtual function user and users are enabled to scale their VF resources. The VF resources are selectively scaled-up and scaled-down responsive to user input based upon VF resource usage.

20 Claims, 9 Drawing Sheets

(56) References Cited

U.S. PATENT DOCUMENTS

| | | |
|---|---|---|
| 8,082,550 B2 | 12/2011 | O'Toole, Jr. |
| 8,583,799 B2 | 11/2013 | Podila |
| 8,732,349 B2* | 5/2014 | Kishore ............... G06F 13/102 710/20 |
| 8,839,240 B2 | 9/2014 | Barrett et al. |
| 2003/0154282 A1 | 9/2003 | Horvitz |
| 2004/0010592 A1 | 1/2004 | Carver et al. |
| 2005/0021446 A1 | 1/2005 | Whinston et al. |
| 2005/0234935 A1 | 10/2005 | Barsness et al. |
| 2006/0190605 A1 | 9/2006 | Franz et al. |
| 2008/0141048 A1 | 6/2008 | Palmer et al. |
| 2008/0154798 A1 | 6/2008 | Valz |
| 2008/0250143 A1 | 10/2008 | Garg et al. |
| 2009/0300608 A1 | 12/2009 | Ferris et al. |
| 2010/0005173 A1 | 1/2010 | Baskaran et al. |
| 2010/0076856 A1 | 3/2010 | Mullins |
| 2010/0088126 A1 | 4/2010 | Iaia et al. |
| 2010/0088205 A1 | 4/2010 | Robertson |
| 2010/0131624 A1 | 5/2010 | Ferris |
| 2010/0217865 A1 | 9/2010 | Ferris |
| 2010/0235355 A1 | 9/2010 | Carter et al. |
| 2010/0319004 A1 | 12/2010 | Hudson et al. |
| 2011/0154353 A1 | 6/2011 | Theroux et al. |
| 2011/0213888 A1 | 9/2011 | Goldman et al. |
| 2011/0225300 A1 | 9/2011 | Kaneki |
| 2012/0030356 A1 | 2/2012 | Fletcher |
| 2012/0260256 A1 | 10/2012 | De Faria et al. |
| 2013/0042086 A1* | 2/2013 | Cardona ............. G06F 12/0284 711/173 |
| 2015/0149661 A1 | 5/2015 | Kanigicherla et al. |
| 2015/0149995 A1 | 5/2015 | Arroyo et al. |
| 2017/0054593 A1* | 2/2017 | Borikar .................. H04L 49/35 |

OTHER PUBLICATIONS

Mauch, V., Kunze, M., & Hillenbrand, M. (2013). "High performance cloud computing." Future Generation Computer Systems, 29(6), pp. 1408-1416.

* cited by examiner

100

---

ADAPTER LEVEL SETTINGS 170

ENABLE RESIZE 171
RESIZE POLL INTERVAL 172
RESIZE POLL FREQUENCY 173
RESIZE POLICY 174 (SIMPLE FIXED RESIZE SIZE %, MEDIUM FIXED MULTIPLE OF 5, AGGRESSIVE NEXT FIXED MULTIPLE OF 25)
MAX SCALE DOWN FAILURE COUNT 175
MAX SCALE UP FAILURE COUNT 176
RESIZE RATIO 177

VIRTUAL FUNCTION (VF) SETTINGS 180

IS-RESIZABLE 181
SCALE DOWN POLICY 182
SCALE DOWN THRESHOLD 183
SCALE UP POLICY 184
SCALE UP THRESHOLD 185

HARDWARE FACILITIES & FUNCTIONS 186

USAGE STATISTICS CHECK AGENT 187
SCALE UP AND SCALE DOWN EVENT COMMANDS 188
DMA WINDOWS 190 FOR EACH ACTIVE SRIOV VF, PF & VF DRIVERS
MMIO WINDOWS 192 FOR EACH ACTIVE SRIOV VF, PF & VF DRIVERS

IMPLEMENTING DYNAMIC COST CALCULATION FOR SRIOV VIRTUAL FUNCTION (VF) IN CLOUD ENVIRONMENTS

FIELD OF THE INVENTION

The present invention relates generally to the data processing field, and more particularly, relates to a method, system and computer program product for implementing dynamic cost calculation for a Single Root Input/Output Virtualization (SRIOV) virtual function (VF) in cloud environments.

DESCRIPTION OF THE RELATED ART

Single root input/output (IO) virtualization (SRIOV) is a PCI standard, providing an adapter technology building block for I/O virtualization within the PCI-Express (PCIe) industry. SRIOV capability is a feature of many new PCIe adapters for Fibre Channel, Ethernet, Infiniband, and Converged Network Adapters (CNA).

The SRIOV adapter has an I/O adapter virtualization architecture that allows a single I/O adapter to be concurrently shared across many different logical partitions. The sharing is done at a physical level, so that each logical partition has access to a slice of the physical adapter. The sharing is accomplished via partitioning the adapter into many different PCI functions, and then distributing access to those functions. The adapter is presented as one or more physical functions (PFs) that control functions, for example used for both configuration and I/O, and a set of virtual functions (VFs), used for I/O and limited configuration, each VF represents a slice of the adapter capacity that can be assigned to a logical partition independently of other VFs. Each logical partition has a device driver for each of the VFs assigned to the logical partition.

A need exists for an effective mechanism to implement dynamic cost calculation for a Single Root Input/Output Virtualization (SRIOV) virtual function (VF) in cloud environments.

SUMMARY OF THE INVENTION

Principal aspects of the present invention are to provide a method, system and computer program product for implementing dynamic cost calculation for a Single Root Input/Output Virtualization (SRIOV) virtual function (VF) in cloud environments. Other important aspects of the present invention are to provide such method, system and computer program product substantially without negative effects and that overcome many of the disadvantages of prior art arrangements.

In brief, a method, system and computer program product are provided for implementing dynamic cost calculation for a Single Root Input/Output Virtualization (SRIOV) virtual function (VF) in cloud environments. A management function periodically queries the SRIOV adapter for activity statistics for each assigned virtual function. The management function builds a usage heuristic based on the resource usage statistics. The management function calculates dynamic cost for the SRIOV VF based on the resource usage statistics. Calculated dynamic costs for the SRIOV VF are provided to a virtual function user and users are enabled to scale their VF resources. The VF resources are selectively scaled-up and scaled-down responsive to user input based upon VF resource usage.

In accordance with features of the invention, the scaled VF resource is generated and send by the management function to both the hypervisor based PF device driver and partition based VF device driver. Both the PF and VF device drivers scale to the VF resources responsive to user input.

In accordance with features of the invention, the service provider can provide different levels of service by dynamically allocating and pricing the VF resources.

In accordance with features of the invention, the SRIOV VF cost equals the sum of static cost and dynamic cost. The static cost equals fixed cost for provisioning a virtual function of given bandwidth from the SRIOV adapter. The dynamic cost equals a percentage % of cost assuming 100% VF resources are being used based upon the usage heuristics.

In accordance with features of the invention, the hypervisor and PF device driver implement an adapter specific interface to provide virtual function statistics and to scale cost based on virtual function usage over a given time interval.

BRIEF DESCRIPTION OF THE DRAWINGS

The present invention together with the above and other objects and advantages may best be understood from the following detailed description of the preferred embodiments of the invention illustrated in the drawings, wherein:

FIGS. 1A and 1B, and FIG. 2 illustrates a respective example computer system and example system for implementing dynamic resizing and dynamic cost calculation of a Single Root Input/Output Virtualization (SRIOV) virtual function (VF) in a SRIOV adapter in accordance with the preferred embodiment;

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method, system and computer program product are provided for implementing dynamic cost calculation of a Single Root Input/Output Virtualization (SRIOV) virtual function (VF) in a SRIOV adapter. The user or customer is enabled to scale VF usage of their virtual functions with corresponding impact on cost.

Figure 1A:
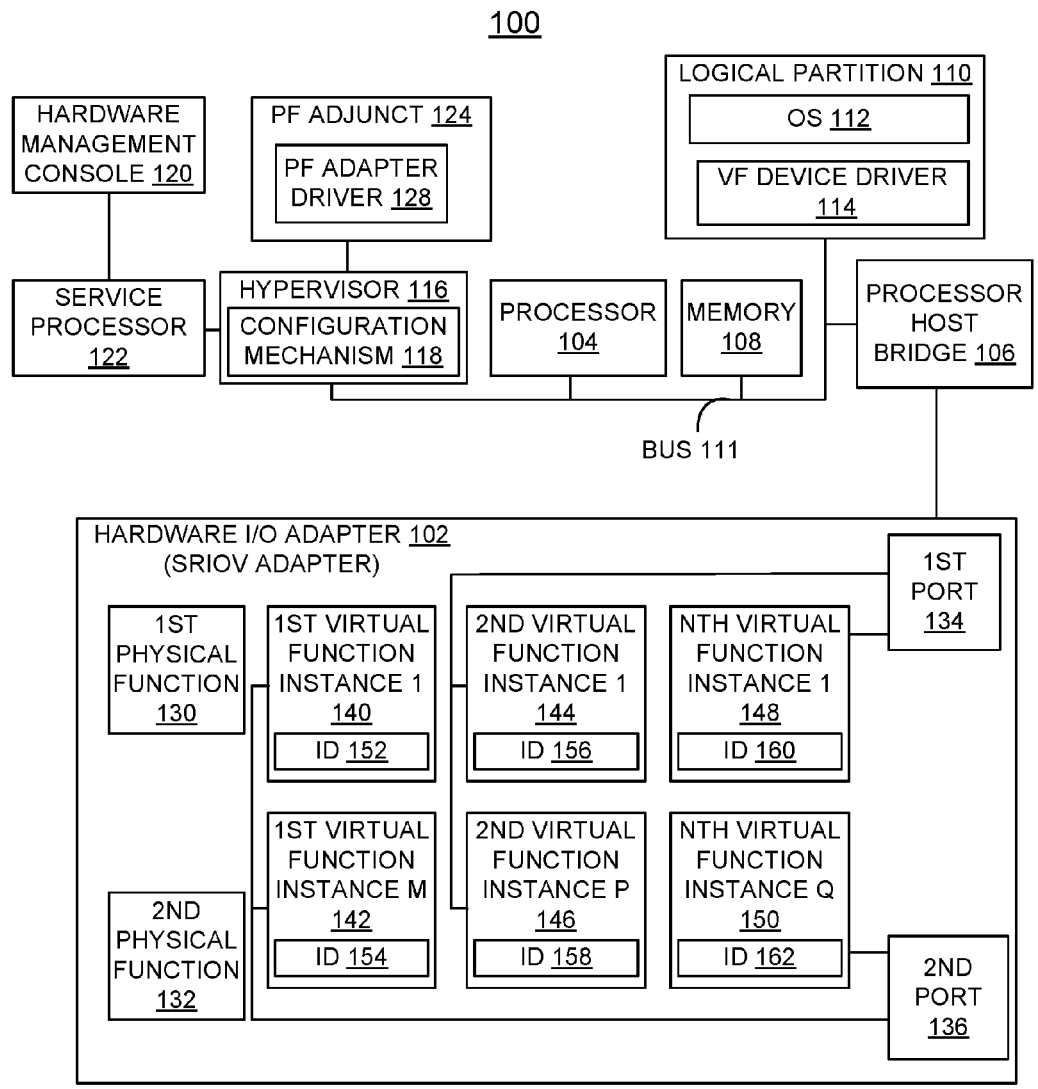

Having reference now to the drawings, in FIGS. 1A and 1B, there is shown an example computer system generally designated by the reference character 100 for implementing dynamic cost calculation of a Single Root Input/Output Virtualization (SRIOV) virtual function (VF) in a SRIOV adapter 102 in accordance with the preferred embodiment. Computer system 100 includes one or more processors 104, or central processor units (CPUs) 104 (one shown) coupled by an I/O hub or processor host bridge 106 to the Single Root Input/Output Virtualization (SRIOV) adapter or hardware I/O adapter 102.

Computer system 100 includes a memory 108 and one or more logical partitions (LPARs) 110 (one shown) coupled by a system bus 111 to the processor 104 and the processor host bridge 106. Each operating system (OS) 112 resides in its own LPAR 110, with each LPAR allocated a part of a physical processor 104, an entire physical processor, or multiple physical processors from the computer 100. A VF device driver 114 is provided with the logical partition (LPAR) 110. A portion of the memory 108 is allocated to each LPAR 110. Computer system 100 includes a hypervisor 116 including a configuration mechanism 118. The hypervisor 116 is a part of the system firmware and manages the allocation of resources to each operating system 112 and LPAR 110.

As shown, a hardware management console (HMC) 120 used, for example, to manage system functions including logical partition configuration, is coupled to the hypervisor 116 via a service processor 122. Computer system 100 includes a physical function (PF) manager or PF adjunct 124 provided with the hypervisor 116. The PF adjunct 124 includes an adapter driver 128 to manage physical functions of the hardware I/O adapter 102. The hypervisor 116 uses the PF adjunct 124, for example, to configure physical functions (PFs) and virtual functions (VFs) of the hardware I/O adapter 102, for example, based on configuration information provided by a system administrator via the hardware management console 120, and for dynamic virtual function (VF) resizing based on VF usage in accordance with the invention.

In accordance with features of the invention, the hardware management console (HMC) 120 implements a user interface to allow user to view cost associated with their virtual functions. The HMC 120 implements an application program interface (API) to allow a user to either scale a virtual function to increase or decrease its resources. The HMC 120 specifies static cost associated with virtual functions. The HMC 120 specifies dynamic cost associated with virtual function. The HMC 120 implements a mechanism to support dynamic cost-based scaling for a virtual function (VF) based on usage.

As shown, the hardware I/O adapter 102 includes, for example, a first physical function 130, a second physical function 132, a first port 134, and a second port 136. The hypervisor 116 using the PF adjunct 124 configures virtual functions based on the physical functions 130, 132 and associates virtual functions with one or more of the ports 134, 136 of the hardware I/O adapter 102.

For example, a first virtual function, 140, instance 1, and the Mth instance of the first virtual function 142, where M is greater than 1, are associated with the second port 136. As shown, a second virtual function 144, such as the first instance of the second virtual function 144 and the Pth instance of the second virtual function 146, where P is greater than 1, are associated with the first port 134. As shown, multiple instances of an Nth virtual function, where N is greater than 2, such as the first instance of the Nth virtual function 148 is associated with the first port 134 and the Qth instance of the Nth virtual function 150, where Q is greater than 1, is associated with the second port 136.

Each instance of the first virtual function 140, 142, the second virtual function 144, 146, and Nth virtual function 148, 150 are hosted by a physical function, such as one of the first physical function 132, the second physical function 132, and another physical function (not shown).

Each instance of the first virtual function 140, 142, the second virtual function 144, 146, and Nth virtual function 148, 150 includes a respective virtual function identifier (ID), shown as ID 152, ID 154, ID 156, ID 158, ID 160, and ID 162. Each virtual function identifier uniquely identifies a particular virtual function that is hosted by the hardware I/O adapter 102. For example, when a message (not shown) is routed to a particular virtual function, the message includes the identifier associated with the particular virtual function.

Referring to FIG. 1B, there are shown example adapter level settings 170 for implementing dynamic cost calculation and resizing of a Single Root Input/Output Virtualization (SRIOV) virtual function (VF) in a SRIOV adapter 102 in accordance with the preferred embodiment. As shown, the adapter level settings 170 apply to all re-sizable virtual functions including an enable resize 171, a resize poll interval 172, a resize poll frequency 173, a resize policy 174, a max scale down failure count 175, a max scale up failure count 176, and a resize ratio 177.

The enable resize setting 171 governs whether resizing of VFs is enabled or not. If the enable resize setting 171 is disabled, the adapter level re-size settings and VF level re-size settings are disabled. The resize poll interval 172 is a resizing heartbeat, such as set values of 1 minute, 5 minutes and 10 minutes. The resize poll interval 172 is the interval at which the management function polls the SRIOV adapter 102 for VF statistics.

The resize poll frequency 173 includes a number of consecutive resize intervals to be tracked before making a decision whether to resize a VF. The resize policy 174 includes for example a simple policy with resources resized by a fixed percentage, such as 25% every time; a medium policy with resources resized by a fixed factor, such as the next multiple of 5; and an aggressive policy with resources resized by a fixed factor, such as the next multiple of 25.

The max scale down failure count 175 is a maximum number of consecutive failures allowed for scale down operations. In case of number of consecutive failures exceed this value 175, the VF is marked as non-resizable for scale-down, and the VF resources are fixed after this point. The max scale up failure count 176 is a maximum number of consecutive failures allowed for scale up operations. In case of number of consecutive failures exceed this value 176, the VF is marked as non-resizable for scale-up, and the VF resources are fixed after this point. The resize ratio 177 is a setting that governs the weight given for DMA and MMIO buffers usage for resize calculations. For example, default value of 50% is set for DMA and MMIO. This means that while determining usage information, both DMA and MMIO will be given equal weight.

Example virtual function settings 180 are shown for implementing dynamic resizing of a Single Root Input/Output Virtualization (SRIOV) virtual function (VF) in a SRIOV adapter 102 in accordance with the preferred embodiment. The virtual function settings 180 include an is-resizable setting 181 that governs whether the VF is re-sizable or not.

A scale down policy 182 must be specified for all virtual functions that want to donate extra resources back to the adapter 102 and hypervisor 116, for example, the user may select one of the three policies described for the resize policy 174.

A scale down threshold setting 183 is enabled only when a scale down policy is selected, and this value indicates the minimum threshold resources percentage for a scale down operation. No scale down is permitted if it reduces the resources below this threshold setting 183. The value of the scale down threshold setting 183 is relative to original resources allocated to this VF, and for example, defaults to 10% of an original VF resource allocation. This means that at the very minimum a SRIOV virtual function may be scaled down to 10% of its original resource value.

A scale up policy setting 184 must be specified for all virtual functions that want to obtain extra resources from the adapter and hypervisor, and the user may select one of the three policies described for the resize policy 174.

A scale up threshold setting 185 is enabled only when scale up policy is selected, and this value indicates the maximum threshold resources percentage for a scale up operation. No scale up is permitted if it exceeds the resources below this threshold 185. The value of the scale up threshold setting 185 is relative to original resources allocated to this VF, and for example, defaults to 200% of original VF resource allocation. This means that at maximum a SRIOV virtual function may be scaled up to 200% of its original resource value.

In FIG. 1B, example hardware facilities and functions 186 are shown for implementing dynamic resizing of a Single Root Input/Output Virtualization (SRIOV) virtual function (VF) in a SRIOV adapter 102 in accordance with the preferred embodiment. The hardware facilities and functions 186 include a usage statistics check agent 187 that runs on the management channel side and periodically gathers VF statistics from the SRIOV adapter 102, and also converts statistics to usage information as per a selected algorithm. The usage information obtained is used by the agent 187 to predict VF usage in a next interval.

The hardware facilities and functions 186 include scale down and scale up event commands 188 that are sent to the hypervisor 116 for resizing a specific VF. The hardware facilities and functions 186 include DMA windows 190 for each active SRIOV VF, PF and VF drivers, and MMIO windows 192 for each active SRIOV VF, PF and VF drivers.

Computer system 100 is shown in simplified form sufficient for understanding the present invention. The illustrated computer system 100 is not intended to imply architectural or functional limitations. The present invention can be used with various hardware implementations and systems and various other internal hardware devices.

Figure 2:
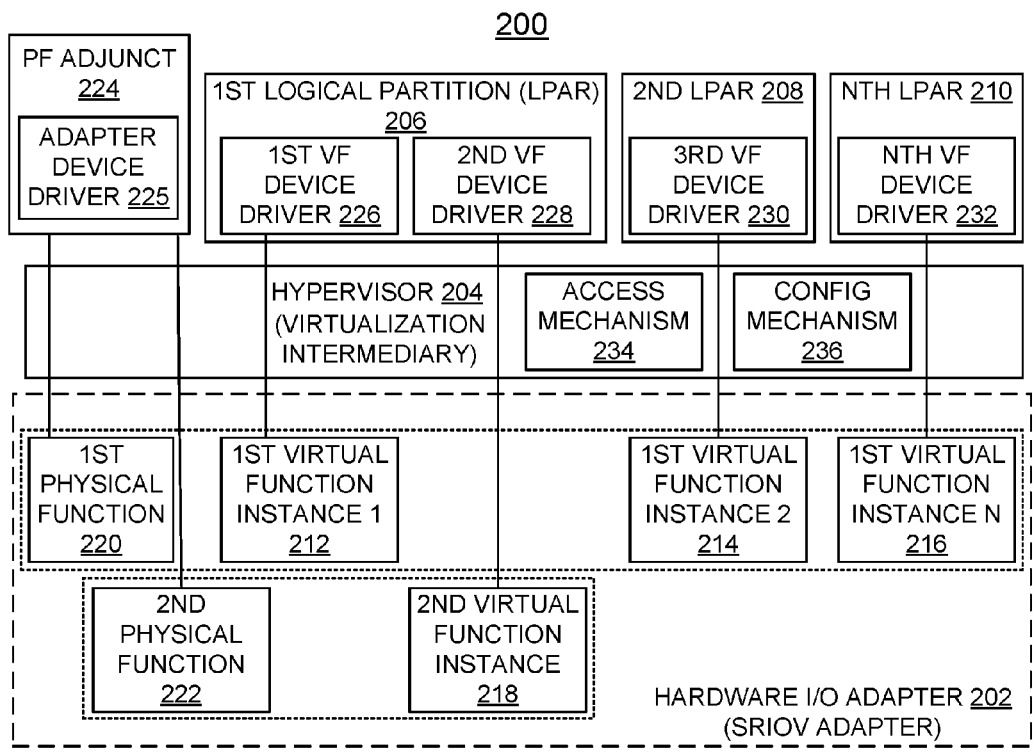

Referring to FIG. 2, there is shown another example system generally designated by the reference character 200 for implementing dynamic resizing of a Single Root Input/Output Virtualization (SRIOV) virtual function (VF) in a SRIOV adapter 102 in accordance with the preferred embodiments.

System 200 includes a hypervisor 204 or other virtualization intermediary, used to enable multiple logical partitions to access virtual functions provided by hardware that includes the hardware I/O adapter 202. For example, as shown in FIG. 2, the hypervisor 204 is used to enable a first logical partition 206, a second logical partition 208, and an Nth logical partition 210, to access a plurality of virtual functions 212, 214, 216, 218 that are provided by the hardware I/O adapter 202. For example, the hypervisor 204 used a first physical function 220 of the hardware I/O adapter 202 to provide a first instance of a first virtual function 212, a second instance of a first virtual function 214, and an Nth instance of a first virtual function 216 to the logical partitions 206, 208, 210. As shown the hypervisor 204 uses a second physical function 222 of the hardware I/O adapter 202 to provide a second virtual function 218 to the logical partitions 206, 208, 210.

The physical functions 220, 222 advantageously include PCI functions, supporting single root I/O virtualization capabilities. Each of the virtual functions 212, 214, 216, 218 is associated with one of the physical functions 220, 222 and adapted to share one or more physical resources of the hardware I/O adapter 202. Each of the virtual functions (VFs) 212, 214, 216, 218 includes the enable resize setting 181 that governs whether the VF is resizable or not.

Software functions or modules, such as a physical function (PF) adjunct 224 including an adapter device driver 225, is provided with the hypervisor 204 for managing the physical functions 220, 222 and the virtual functions (VFs) 212, 214, 216, 218. For example, a user may specify a particular configuration and a particular resizing policy 174 and the hypervisor 204 uses the PF adjunct 224 to configure and dynamically resize the virtual functions 212, 214, 216, 218 from the physical functions 220, 222.

For example, in operation the hypervisor 204 with the PF adjunct 224 enables the first virtual function instances 212, 214, 216 from the first physical function 220. The hypervisor 204 with the PF adjunct 224 enables the second virtual function 218 from the second physical function 222. The virtual functions 212, 214, 216, 218 are enabled, for example, based on a user provided configuration and are dynamically resized based on VF usage. Each of the logical partitions 206, 208, 210 may execute an operating system (not shown) and client applications (not shown).

As shown, the client applications that execute at the logical partitions 206, 208, 210 perform virtual input/output operations and include a respective device driver to directly manage an associated virtual function. For example, a first client application executing at the first logical partition 206 may include a first client VF device driver 226, and a second client application executing at the first logical partition 206 may include a second client VF device driver 228.

As shown, the first client VF device driver 226 accesses the first instance of the first virtual function 212. The second client virtual VF device driver 228 accesses the second virtual function 218. A third client VF device driver 230 executing at the second logical partition 208 accesses the second instance of the first virtual function 214. An Nth client VF device driver 232 executing at the Nth logical partition 210 accesses the Nth instance of the first virtual function 216. An access mechanism 234 and a configuration mechanism 236 are provided with the hypervisor 204 to associate a logical partition with an accessed virtual function. The hypervisor 204 uses the access mechanism 234 to enable logical partitions, such as LPAR 206 to access configuration space associated with one or more of the virtual functions 212, 214, 216, 218.

System 200 is shown in simplified form sufficient for understanding the present invention. The illustrated system 200 is not intended to imply architectural or functional limitations. The present invention can be used with various hardware implementations and systems and various other internal hardware devices.

In accordance with features of the invention, the hypervisor 204 supports the new types of events of the invention, the scale down and scale up events originating from the management function. The hypervisor 204 relays the scale down and scale up events to the VF device driver 226 to allow the VF device driver to resize resource ranges. The hypervisor 204 relays the scale down and scale up events to the PF device driver 225 to allow the PF device driver to resize adapter resource ranges.

In accordance with features of the invention, the PF device driver 225 receives the scale up and scale down events from the hypervisor and relays the events to the SRIOV adapter 102. The PF device driver notifies the hypervisor of the success or failure of resize operation. The PF device driver 225 reserves extra DMA and MMIO buffers for the VF, while the extra DMA and MMIO buffers are only reserved and not used until the hypervisor 204 requests the PF device driver (DD) to start using the same.

In accordance with features of the invention, the VF device driver 226 receives the scale up and scale down events from the hypervisor 204 and applies the new ranges for DMA and MMIO after successful handling of current transaction without stopping the VF 212. The VF device driver 226 notifies the hypervisor 204 of the success or failure of resize operation.

In accordance with features of the invention, dynamic resizing of the SRIOV VF is provided according to their usage statistics collected over a period of time. For example, a user specifies whether a VF may be resized and the upper and lower limits on VF resizing at the time of VF creation. The management function periodically polls the adapter 102 for VF statistics. These statistics are gathered by management function for all VFs that may be resized. The management function collects statistics for resize poll frequency 173 consecutive intervals. The interval used for polling VFs, resize poll interval 172 is specified by management function administrator when configuring this feature. VF usage is determined by checking what percentage of DMA and MMIO buffers were used in a particular interval.

In accordance with features of the invention, usage information from raw statistics is determined by identifying a percentage of the allocated DMA and MMIO buffers that were used for a particular interval. For instance if for a particular second interval only 25% DMA buffers and 35% MMIO buffers are being used, the usage % is said to be 30%. The percentage is with reference to the DMA and MMIO space allocated to the specific VF. The usage information is obtained by gathering statistics every resize poll interval 172 and averaging the collected statistics, such as represented by the following equations:

$$DMA\_Usage_i=(Adapter\_DMA\_Stats_i-Adapter\_DMA\_Stats_{i-1})/(resize\_poll\_interval* MAX\_DMA\_FOR\_THIS\_VF\_PER\_POLL\_INTERVAL)$$

$$MMIO\_Usage_i=(Adapter\_MMIO\_Stats_i-Adapter\_MMIO\_Stats_{i-1})/(resize\_poll\_interval* MAX\_MMIO\_FOR\_THIS\_VF\_PER\_POLL\_INTERVAL)$$

Equal weight optionally is given to both DMA and MMIO utilization, and may be configured via a management function option.

In accordance with features of the invention, dynamic resizing of the SRIOV VF is determined based on VF usage. If the usage thus determined is less than the lower usage threshold, a scale down operation is performed. Alternatively if the usage is greater than higher usage threshold, a scale up operation is performed. The resize operation is performed if and only if all the usage values gathered during consecutive resize poll frequency cycles are either all less than lower threshold or all the statistics are higher than higher threshold with no resizing operation being performed for mixed usage. For example, management function initiates a corrective scale up or scale down action and resets the frequency counter. The next statistics gathering phase starts after the scale up/scale down operation is complete. Hence resize poll frequency implies a number of consecutive intervals that a particular pattern should hold. Identifying a number of consecutive intervals pattern for a few cycles before making a resize decision allows the VF to absorb occasional high and low usage blips.

In accordance with features of the invention, usage information for dynamic resizing SRIOV VF is determined based on VF usage history. The past usage patterns are used for predicting future usage and allocating/de-allocating resources based on predicted future usage. Future usage value is calculated on the basis on usage patterns for the past resize poll frequency cycles. Once the average usage value is calculated as described above, the resources are re-sized as per the resize policy 174 set in the management function. The variation of weighted mean approach is used with more emphasis to current history for calculating future usage, such as represented by the following equation:

$$U_N=(N*U_N+(N-1)*U_N+(N-2)*U_N+ \ldots +1*U_1))/(N+(N-1)+(N-2)+ \ldots 1)$$

Consider the following formula for usage prediction with resize_poll_interval value as 5 as follows:

$$U_{T6}=(5*U_{T5}+4*U_{T4}+3*U_{T3}+2*U_{T2}+1*U_{T1}))/(5+4+3+2+1)$$

For example given the input past usage values of 20, 15, 7, 0, 10

$$U_{T6}=(5*10+4*0+3*7+2*15+20)/15=8.0$$

Once a usage value is determined, a resize policy 174 is applied to obtain desired resource re-size. Resize policies may be selected from the management function. In the above case the usage is 8% of existing resources. Applying the 3 policies results in following behavior, simple policy uses 75% of existing resources, medium policy uses 25% of existing resources, and aggressive policy uses 10% of existing resources.

Figure 3:
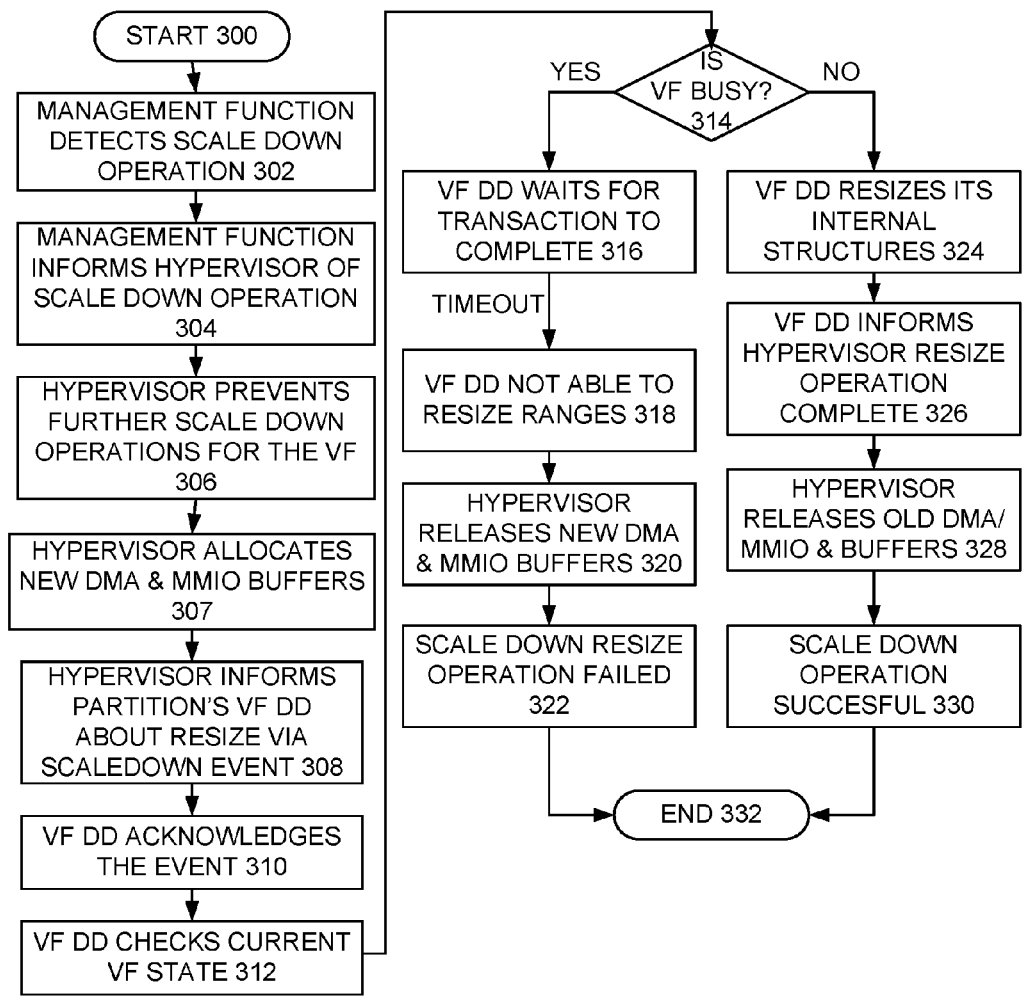
FIGS. 3, 4, 5, 6, and 7 together provide a flow chart illustrating example operations for implementing dynamic resizing of a Single Root Input/Output Virtualization (SRIOV) virtual function (VF) for the SRIOV adapter in accordance with the preferred embodiment and illustrating example operations for implementing dynamic cost calculation of a Single Root Input/Output Virtualization (SRIOV) virtual function (VF) for the SRIOV adapter in accordance with the preferred embodiment.
Figure 4:
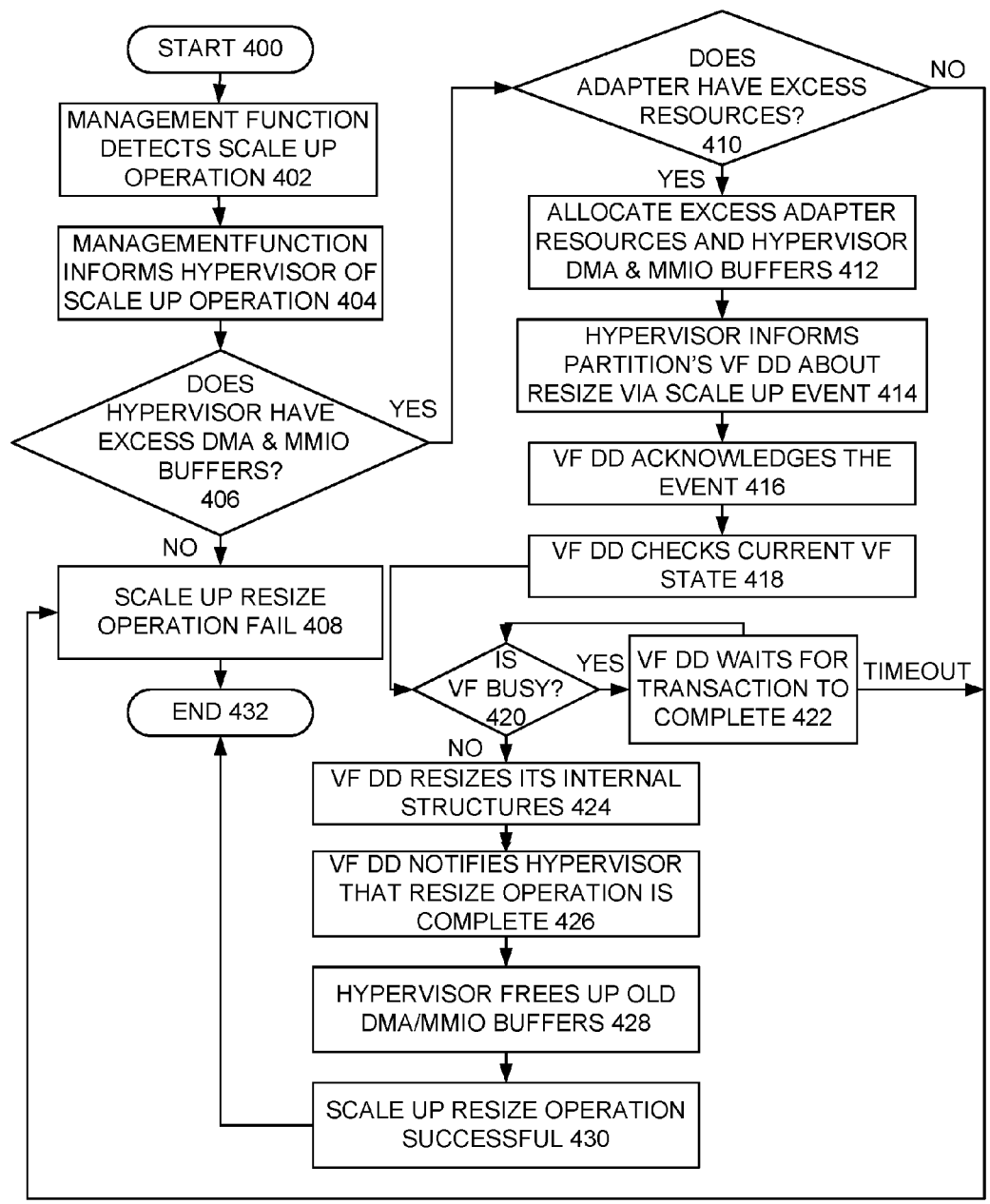
Figure 5:
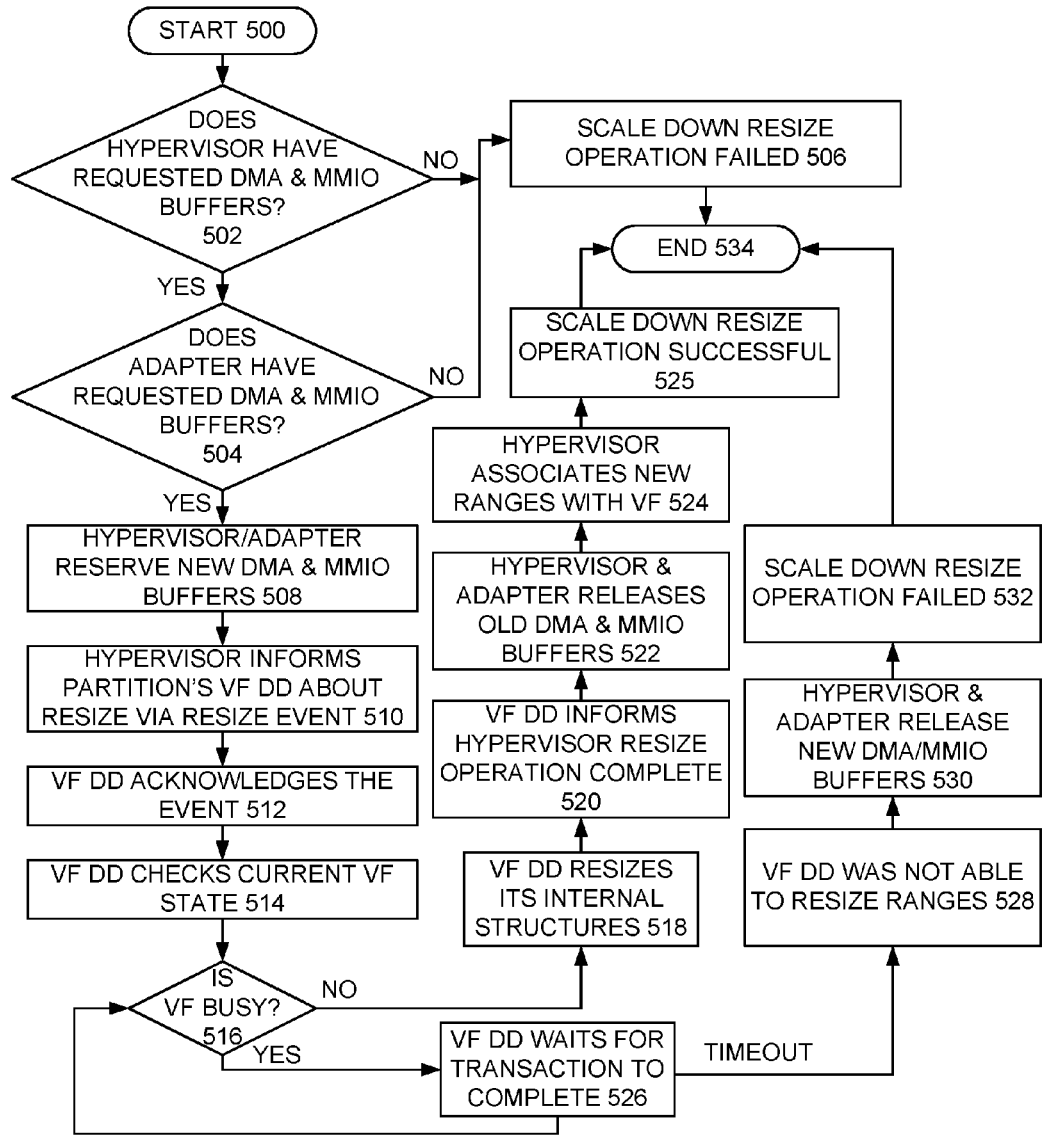

Referring to FIGS. 3, 4, and 5, there are shown exemplary operations of the processing and logic provided by the processor 104 and hypervisor 116 for implementing dynamic resizing of a Single Root Input/Output Virtualization (SRIOV) virtual function (VF) in a SRIOV adapter 102 in accordance with the preferred embodiment.

In FIG. 3, scale down operations start as indicated in a block 300. A scale down operation returns excess DMA and MMIO buffers back to the hypervisor. The corresponding adapter resources are also freed. The binding between the excess resources and the corresponding VF is broken and these resources are returned to the adapter and the hypervisor. These resources may be used for new VFs and/or scale-up operations. The management function detects a scale down operation as indicated in a block 302. The scale down re-size operation starts with management function notifying the hypervisor that the VF is not utilizing its resources effectively and is a candidate for resource reclamation as indicated in a block 304. The hypervisor prevents further scale down operation for this VF as indicated in a block 306. The hypervisor allocates new DMA and MMIO buffers for the VF as indicated in a block 307, and since the previous buffers may be being used at this time, the hypervisor does not free up old DMA and MMIO buffers. As indicated in a block 308 the hypervisor sends an event to the VF DD indicating that the VF DD needs to re-size its DMA and MMIO ranges via the scale down event. The VF driver running in the LPAR acknowledges this event from the hypervisor as indicated in a block 310. The VF device driver checks the current VF state as indicated in a block 312, in order to re-size its buffers to align with the hypervisor. The VF device driver may have to wait for the current transactions to end before resizing its buffers as indicated in a decision block 314 and 316. If the VF device driver is not able to resize the ranges as indicated in a block 318, the hypervisor releases the new DMA and MMIO buffers as indicated in a block 320 and the old VF resources are not changed. The scale down operation has failed as indicated in a block 322. If the VF DD is not able to scale down its resource usage at block 318, the scale down operation fails immediately. Also if the VF DD is able to scale down but the PF device driver is not able to free up adapter resources, the hypervisor sends a scale up event to the VF DD to reinstate its resources to their previous values. The scale down operation is deemed failed in both cases at block 322.

In accordance with features of the invention, if the scale down operation fails multiple times, the management function guards scale down operation for this VF. This is done to prevent CPU cycles when a re-size fails due to hardware problem. Similarly if the VF DD does not send an acknowledgment that VF resize event was successfully or unsuccessfully handled, the hypervisor assumes failure and de-allocates the newly allocated buffers at block 320. This is also another case of scale down operation failing at block 322.

When the VF is not busy, the VF device driver resizes it internal structures as indicated in a block 324. Once the re-size is complete from VF driver perspective, the VF device driver notifies the hypervisor as indicated in a block 326. The hypervisor now releases the old buffers as indicated in a block 328 and also sends a command to PF device driver to use the newly allocated adapter resources. When all three parts are successfully re-sized, the scale down operation is deemed completed and successful as indicated in a block 330, and the excess DMA and MMIO space has been freed from standpoint of the VF, hypervisor and adapter. Operations end as indicated in a block 332.

In FIG. 4, scale up operations start as indicated in a block 300. A scale up operation is performed by allocating more DMA buffers and MMIO space for an active SRIOV VF. Once the management function detects a scale up operation as indicated in a block 402 and the management function decides the percentage of excess DMA and MMIO resources to be allocated. The scale up re-size operation starts with management function notifying the hypervisor as indicated in a block 404. As indicated in a decision block 406, once the hypervisor gets this request, the hypervisor checks if it has excess DMA and MMIO buffers to allocate requested MMIO and DMA space to the VF. If the hypervisor does not have excess buffers that it can allocate, the scale up resize operation fails as indicated in a block 408. If the hypervisor has excess buffers that it can allocate, the hypervisor queries the adapter to check if the adapter can allocate resources for this VF as indicated in a decision block 410. If either check fails due to resource limitation, the scale up call returns a failure to the management function and the operations end as indicated in a block 432.

In case of success, the hypervisor allocates excess DMA and MMIO buffers as indicated in a block 412. After that the hypervisor informs the VF DD of its new DMA and MMIO ranges via a scale up event as indicated in a block 414. The VF DD acknowledges the event as indicated in a block 416.

Checking if the VF is busy is performed as indicated in a block 418. As indicated in a decision block 420, if the VF is busy, the VF waits for the ongoing transaction to complete before resizing its resources as indicated in a block 422. When the VF is not busy, the VF device driver resizes it internal structures as indicated in a block 424. Once the re-size is complete from VF driver perspective, the VF device driver notifies the hypervisor as indicated in a block 426. The hypervisor now releases the old buffers as indicated in a block 428 and also sends a command to PF device driver to use the newly allocated adapter resources. When all three parts are successfully re-sized, the scale up operation is deemed completed and successful as indicated in a block 430, and the excess DMA and MMIO space has been freed from VF, hypervisor and adapter standpoint. At this time the VF has been re-sized from adapter and hypervisor perspective. Operations end as indicated in a block 432.

In accordance with features of the invention, in case of failures, the management function may try again after some time. If a scale up failure threshold specified in the management layer is reached, the VF is effectively locked for scale-up operation.

In accordance with features of the invention, in case of DMA and MMIO requests when a resize operation is in progress, requests originating from adapter 102 or LPAR will hit hypervisor in 3 cases as follows:
1. Both PF device driver and VF device driver using new MMIO/DMA ranges;
2. Both PF device driver and VF device driver using old MMIO/DMA ranges; and
3. VF DD using the new ranges while PF DD is using the old DMA/MMIO ranges.

In accordance with features of the invention, any requests that originate from the adapter while the resize is going on can hit the VF DD. If this request hits the VF when the old ranges are being used, the old ranges will be used for this transaction. If the adapter request hits when the VF is using new ranges and the adapter is using new ranges, the transaction will use new ranges. When the VF has resized to the new DMA/MMIO ranges while the hypervisor has requested or is in the process of requesting PF DD to use the new ranges, at this time the hypervisor has not yet freed up old memory and the PF DD is using the old ranges. This situation is prevented from arising by effectively locking DMA/MMIO operations between VF resize and hypervisor resize completion. Note that outstanding MMIO operations are processes before the VF has resized.

In accordance with features of the invention, error handling is very important for both scale down and scale up resize operations since there are multiple components involved and the failure of one component to properly resize impacts the success of the operation. As such the entire error handling is based on two main concepts, first requiring verification that all resize operations complete successfully for the entire operation to be successful and second in case of failures, roll back any changes made.

In accordance with features of the invention, error handling includes for the simplification of implementation an assumption that the VF scale up operation will never fail. The reasoning behind the assumption is that the VF range is just a number and since we are increasing the number from original value, this operation should never fail. The algorithm makes sure that all outstanding requests have been processed while the VF resize operation is being performed. Locking is used to make sure that only one VF is being resized at one time. Also this VF is locked and does not accept any requests while the resize is ongoing so that any application that tries to use this VF gets a Try-again error. The same error handling algorithm is used for scale up and scale down error handling.

In FIG. 5, error handling operations start as indicated in a block 500. After the resize operation is received by hypervisor and the hypervisor checks whether it has enough buffers for resizing as indicated in a decision block 502. The hypervisor checks whether the adapter has enough buffers for resizing as indicated in a decision block 504. If the hypervisor or the adapter does not have extra buffers, the operation fails here as indicated in a block 506. If both the adapter and hypervisor have excess buffers, excess buffers are reserved as indicated in a block 508.

On successful reservation, the hypervisor sends a message to the VF DD that it should resize its buffers via a resize event as indicated in a block 510. Then the VF DD acknowledges the event as indicated in a block 512. The VF device driver checks the current VF state as indicated in a block 514. When determined that the VF is not busy as indicated in a decision block 516, the VF device driver resizes it internal structures as indicated in a block 518. Once the re-size is complete from VF driver perspective, the VF device driver notifies the hypervisor as indicated in a block 520. The hypervisor and adapter now release the old buffers as indicated in a block 522 and the hypervisor associates the newly allocated adapter resources with the VF as indicated in a block 524. The scale down resize operation is successful as indicated in a block 525. Operations end as indicated in a block 534.

When determined that the VF is busy at decision block 516, the VF DD waits for the transaction to complete as indicated in a block 526. If a timeout occurs, the VF DD is not able to resize in a given time as indicated in a block 528, the hypervisor and adapter now release the new buffers as indicated in a block 530 and the scale down resize operation has failed as indicated in a block 532. When the VF DD returns a failure and the hypervisor and adapter free the new buffers. When the hypervisor does not receive a response from the partition within the set timeout seconds, the hypervisor assumes failure and frees up the new buffers and operations end at block 534.

Figure 6:
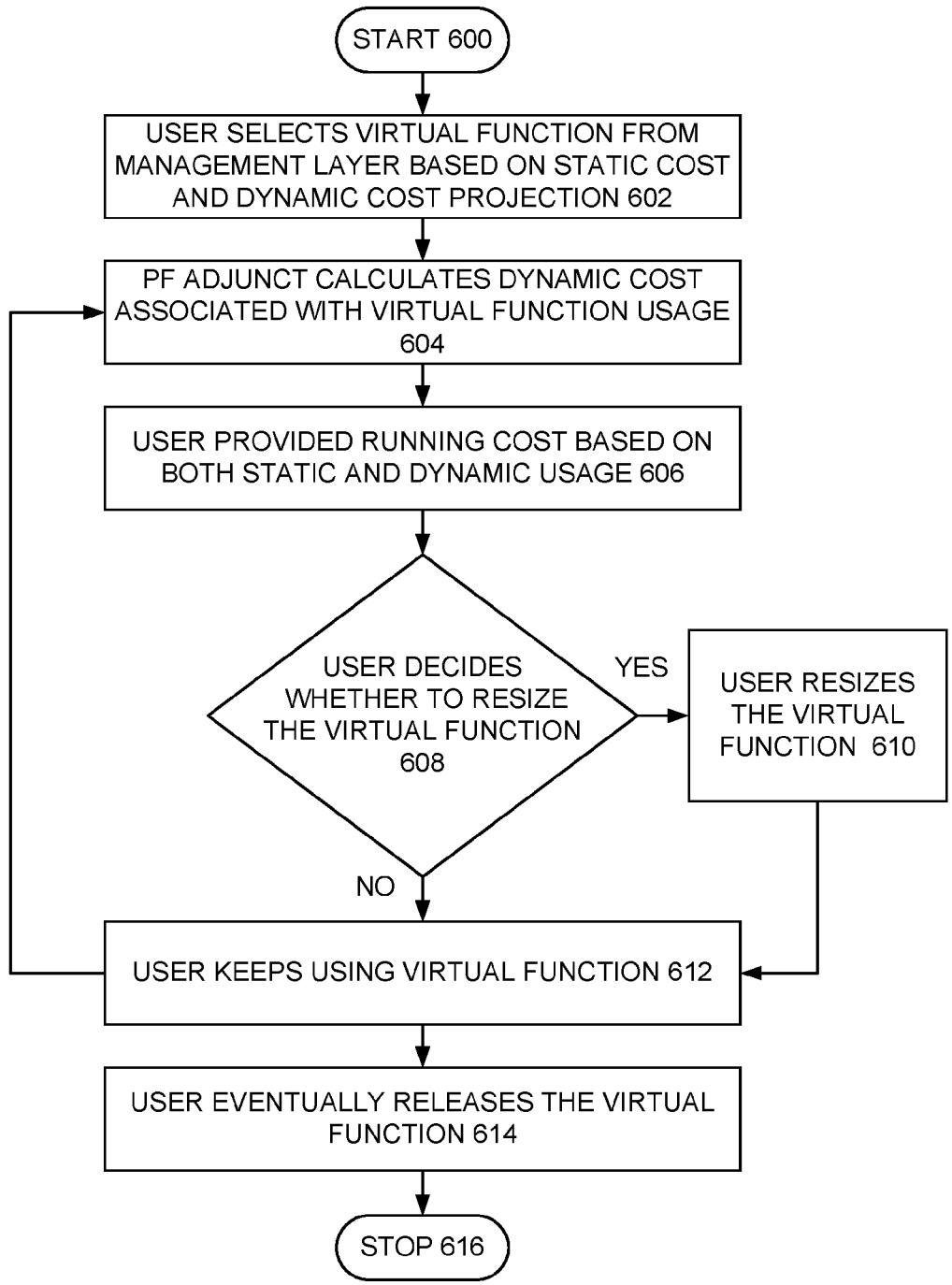
Figure 7:
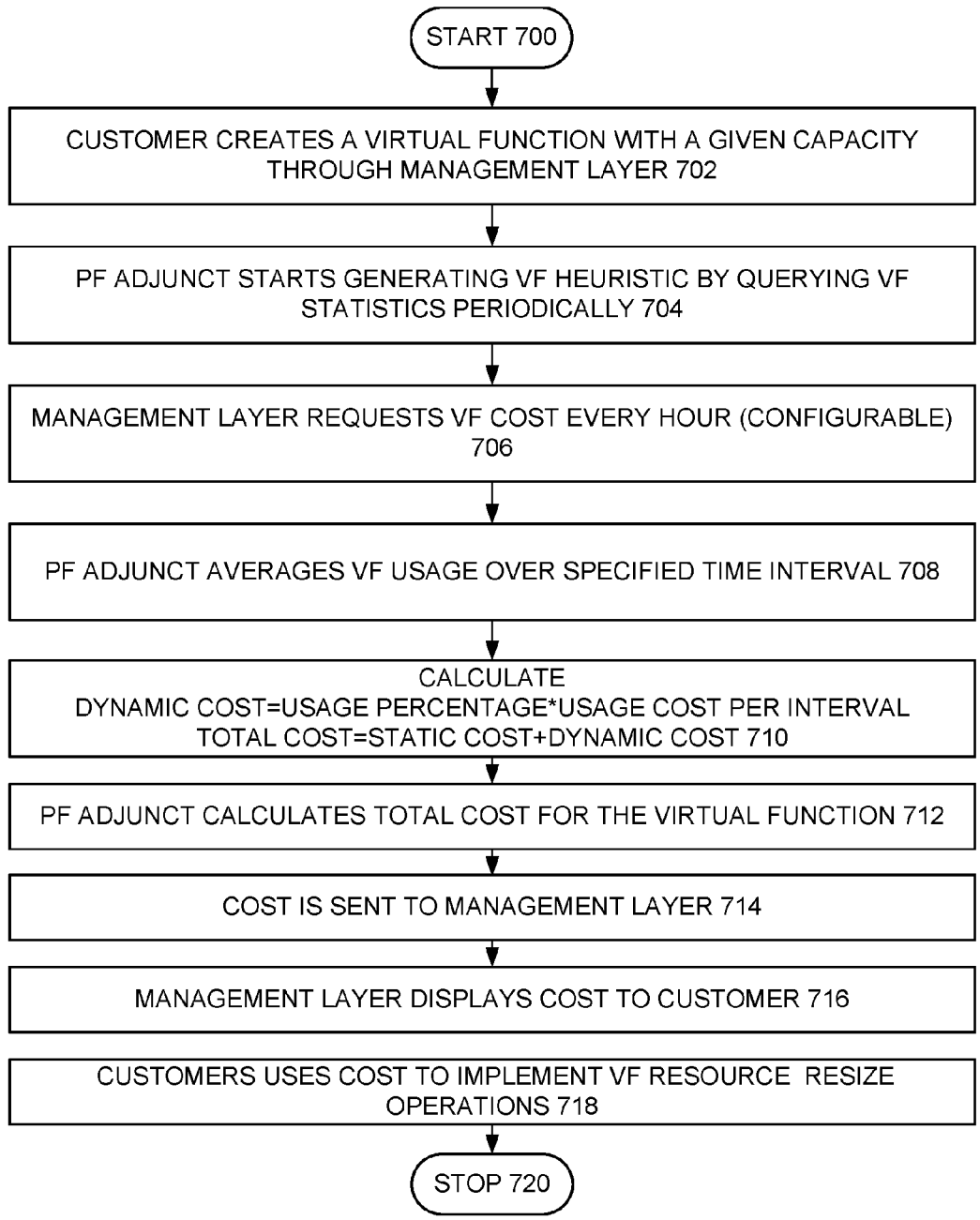

Referring to FIGS. 6 and 7, there are shown exemplary operations of the management layer provided with the processor 104 and hypervisor 116 for implementing dynamic cost calculation of a Single Root Input/Output Virtualization (SRIOV) virtual function (VF) in a SRIOV adapter 102 and scaling VF resources in accordance with the preferred embodiment.

In accordance with features of the invention, an SRIOV adapter management layer displays usage information and corresponding cost to the user for a SRIOV virtual function (VF). A user or data center vendor of the SRIOV adapter 102 is provided with a mechanism to calculate pricing information for a SRIOV virtual function (VF) in a dynamic usage based way. The virtual function user is enabled to view their current usage and price information. Further customers are allowed to selectively increase and decrease the resources for their virtual function based on dynamic need and budget. The user or customers are enabled to scale their virtual functions with corresponding impact on cost.

In FIG. 6, there is shown a main flow of dynamic cost calculation operations starting as indicated in a block 600. As indicated in a block 602, a user selects a virtual function from management layer based on static cost and dynamic cost projection. The Static Cost equals Fixed cost for provisioning virtual function of given bandwidth from SRIOV adapter 102. The Dynamic Cost equals % of cost assuming 100% VF resources are being used based on heuristics. The PF adjunct calculates dynamic cost associated with the virtual function usage as indicated in a block 604. VF usage statistics are used to calculate dynamic cost associated with the SRIOV virtual function. As indicated in a block 606, the user is provided with running total cost based on both static and dynamic usage. The management function implements a user interface to allow the user to view cost associated with their virtual functions at block 606. As indicated in a decision block 608, the user decides whether to resize a virtual function. When the user decides to resize the virtual function, the user resizes the virtual function as indicated in a block 610, with selected operations such as shown in FIGS. 3, 4, and 5. The user continues using the virtual function as indicated in a block 612 and operations return to block 604. As indicated in a block 614, the user eventually releases the virtual function, and the operations stop at a block 616.

In FIG. 7, dynamic cost calculation operations start as indicated in a block 700. As indicated in a block 702, a user creates a virtual function with a given capacity through the management layer. For example, the management layer is used to provision a virtual function. The provisioned virtual function is one of many virtual functions provided by the SRIOV adapter. The PF adjunct firmware manages the SRIOV adapter and its corresponding virtual functions.

The PF adjunct starts generating VF heuristic by querying VF usage statistics periodically as indicated in a block 704. The PF adjunct environment gathers virtual function statistics as described with respect to FIGS. 3, 4, and 5. These statistics are displayed to the virtual function user via management layer user interface. These statistics show the percentage of provided bandwidth that the virtual function user is using at any given point. The management layer requests VF cost for a configurable time period, such as every hour as indicated in a block 706. The PF adjunct averages the VF usage over the specified time interval as indicated in a block 708. Static Cost=Fixed cost for provisioning virtual function of given bandwidth from SRIOV adapter 102, Dynamic Cost=% of cost assuming 100% VF resources are being used based on heuristics, and total cost equals the sum of static cost and the dynamic cost, as indicated in a block 710. For example, the management layer defines the constant static cost for a virtual function of a given bandwidth on per SRIOV adapter basis. The management layer also defines the dynamic cost associated with such a virtual function. The PF adjunct uses both the dynamic and static cost to calculate running cost associated with a SRIOV virtual function (VF) for any given time interval.

As indicated in a block 712, the PF adjunct calculates total cost using the static cost and the calculated dynamic cost. The calculated cost is sent to the management layer as indicated in a block 714. The management layer displays the calculated cost to the user or customer as indicated in a block 716. Both the statistics and the cost associated with a virtual function operation are exposed to the end customer via a management layer interface. The main motivation for providing the same is to allow the data center VF customer to increase or decrease their virtual function usage with corresponding impact on VF pricing. This gives customers the ability to increase VF usage to handle extra loads during busy operation times and to scale down the usage during slow times.

Users make resize decisions using cost to selectively implement VF resource resize operations as indicated in a block 718. A mechanism is provided to automatically scale VF resources with corresponding increase in cost and vice versa. To allow for the same, dynamic cost is scaled based on minimum and maximum usage of VF resources. For example, the management layer include a use option that indicates that if the demand is roughly at X % (where X % is close to the maximum) for a specific duration, management layer allows the maximum resource usage to float to a new maximum level for a cost. Once the demand drops below X % for a period of time, management layer drops the maximum resource limit down again and lower the cost accordingly. This allows for a dynamic cost based scaling for SRIOV VFs. Operations end or stop as indicated in a block 720.

Figure 8:
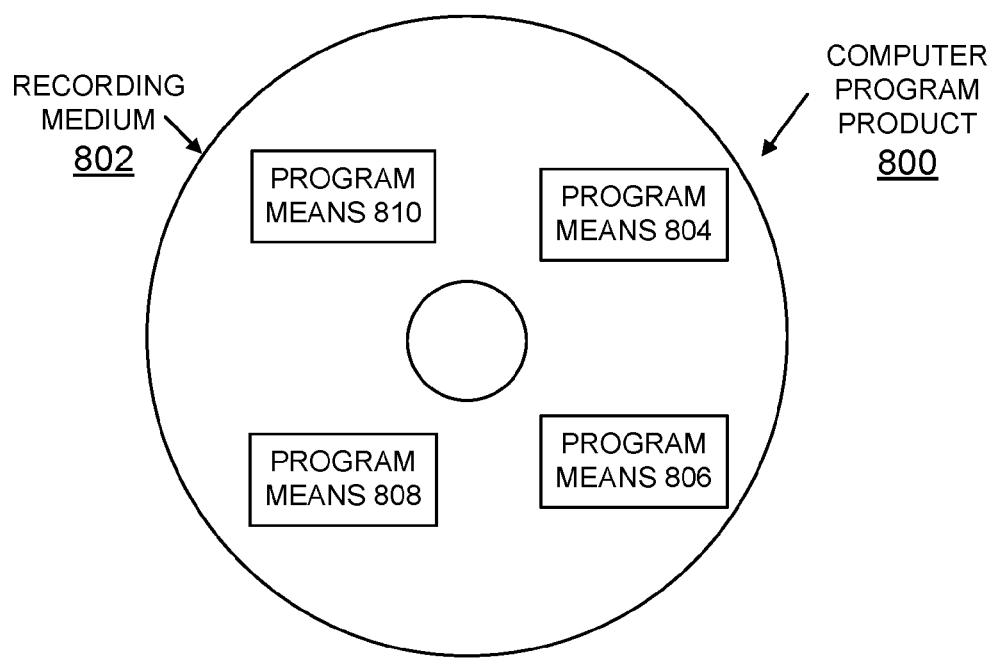
FIG. 8 is a block diagram illustrating a computer program product in accordance with the preferred embodiment.

Referring now to FIG. 8, an article of manufacture or a computer program product 800 of the invention is illustrated. The computer program product 800 is tangibly embodied on a non-transitory computer readable storage medium that includes a recording medium 802, such as, a floppy disk, a high capacity read only memory in the form of an optically read compact disk or CD-ROM, a tape, or another similar computer program product. Recording medium 802 stores program means 804, 806, 808, and 810 on the medium 802 for carrying out the methods for implementing dynamic cost calculation of a Single Root Input/Output Virtualization (SRIOV) virtual function (VF) of a preferred embodiment in the system 100 of FIG. 1, or system 200 of FIG. 2.

A sequence of program instructions or a logical assembly of one or more interrelated modules defined by the recorded program means 808, 808, 808, and 810, direct the computer system 800 for implementing dynamic cost calculation of a Single Root Input/Output Virtualization (SRIOV) virtual function (VF) of a preferred embodiment.

While the present invention has been described with reference to the details of the embodiments of the invention shown in the drawing, these details are not intended to limit the scope of the invention as claimed in the appended claims.

What is claimed is:

1. A method for implementing dynamic cost calculation of a Single Root Input/Output Virtualization (SRIOV) virtual function in a SRIOV adapter in a virtualized system comprising:
    enabling the virtual function (VF) to be dynamically resizable;
    identifying SRIOV virtual function (VF) usage for the SRIOV virtual function (VF);
    identifying dynamic cost for the SRIOV virtual function (VF) responsive to the identified SRIOV virtual function (VF) usage over a given time interval;
    displaying a total cost for the SRIOV virtual function (VF) using a static cost and the identified dynamic cost for viewing by the virtual function (VF) user; and
    generating a resize event responsive to user input to selectively scale VF resources based upon the identified SRIOV virtual function (VF) usage.

2. The method as recited in claim 1, includes providing the SRIOV adapter with a plurality of virtual functions (VFs) and providing a physical function (PF) with the Single Root Input/Output Virtualization (SRIOV) adapter, said physical function containing said plurality of virtual functions (VFs), and wherein said static cost of each of said plurality of virtual functions (VFs) includes a fixed cost for provisioning each said virtual function (VF) of a given bandwidth from the SRIOV adapter.

3. The method as recited in claim 1, wherein identifying SRIOV virtual function (VF) usage for the SRIOV virtual function (VF) includes providing a management function for periodically querying the SRIOV adapter for activity statistics for each SRIOV virtual function (VF) enabled to be resized, and calculating VF resource usage based on the activity statistics.

4. The method as recited in claim 3, wherein generating the resize event includes sending the resize event to both a physical function (PF) driver and a virtual function (VF) driver for the SRIOV virtual function (VF).

5. The method as recited in claim 1, wherein identifying SRIOV virtual function (VF) dynamic cost includes providing a management function for calculating dynamic SRIOV VF cost using identified usage statistics.

6. The method as recited in claim 1, wherein generating the resize event responsive to user input to selectively scale VF resources includes providing a management function for periodically querying the SRIOV adapter for activity statistics for each SRIOV virtual function (VF) enabled to be resized, calculating VF resource usage based on the activity statistics, and using the calculated VF resource usage to identify dynamic cost for the SRIOV virtual function (VF), and providing dynamic cost based scaling for SRIOV VF resources.

7. The method as recited in claim 6, providing a physical function (PF) adjunct for implementing an adapter specific interface to provide virtual function activity statistics.

8. The method as recited in claim 6, includes providing a hypervisor receiving the generated resized event generated by the management function, and the hypervisor sending the corresponding resize event to a hypervisor based physical function (PF) device driver and partition based virtual function (VF) device driver.

9. The method as recited in claim 1, includes providing a management function for implementing a user interface for displaying a total cost for the SRIOV virtual function (VF).

10. The method as recited in claim 7, includes providing a management function enabling a user to scale the SRIOV virtual function (VF) to selectively increase and decrease VF resources.

11. A system for implementing dynamic cost calculation of a Single Root Input/Output Virtualization (SRIOV) virtual function in a SRIOV adapter in a virtualized system comprising:
    the SRIOV adapter comprising a plurality of virtual functions (VFs), and a physical function (PF) containing said plurality of virtual functions (VFs);
    a processor;
    a management function and a hypervisor managing functions associated with the SRIOV adapter including the SRIOV PF and VFs;
    said processor using said management function and said hypervisor to perform the steps of:
    enabling the virtual function (VF) to be dynamically resizable;
    identifying SRIOV virtual function (VF) usage for the SRIOV virtual function (VF);
    identifying dynamic cost for the SRIOV virtual function (VF) responsive to the identified SRIOV virtual function (VF) usage over a given time interval;
    displaying a total cost for the SRIOV virtual function (VF) using a static cost and the identified dynamic cost for viewing by the virtual function (VF) user; and
    generating a resize event responsive to user input to selectively scale VF resources based upon the identified SRIOV virtual function (VF) usage.

12. The system as recited in claim 11, wherein said management function and said hypervisor include control code tangibly embodied in a non-transitory machine readable medium used for implementing dynamic cost calculation of the SRIOV VF.

13. The system as recited in claim 11, wherein said static cost of each of said plurality of virtual functions (VFs) includes a fixed cost specified by said management function for provisioning each said virtual function (VF) of given bandwidth from the SRIOV adapter.

14. The system as recited in claim 11, wherein identifying SRIOV virtual function (VF) usage for the SRIOV virtual function (VF) includes said processor using said management function for periodically querying the SRIOV adapter for activity statistics for each SRIOV virtual function (VF) enabled to be resized, and calculating VF resource usage based on the activity statistics.

15. The system as recited in claim 11, wherein generating the resize event includes said processor using said hypervisor for sending the resize event to both a physical function (PF) driver and a virtual function (VF) driver for the SRIOV virtual function (VF) to be resized.

16. The system as recited in claim 11, wherein generating the resize event responsive to user input to selectively scale VF resources includes said processor using said management function for periodically querying the SRIOV adapter for activity statistics for each SRIOV virtual function (VF) enabled to be resized, calculating VF resource usage based on the activity statistics, and using the calculated VF resource usage to identify dynamic cost for the SRIOV virtual function (VF) over a given time interval.

17. The system as recited in claim 11, includes said processor using said management function for implementing a user interface for displaying a total cost for the SRIOV virtual function (VF).

18. The system as recited in claim 11, includes said processor using said management function for implementing selective scaling of VF resource usage responsive to user input to increase VF usage to handle extra loads during busy operation times and to scale down the VF usage during slow times based on running dynamic cost of the SRIOV VF.

19. The system as recited in claim 11, wherein identifying SRIOV virtual function (VF) usage for the SRIOV virtual function (VF) includes said processor using said management function and said hypervisor for determining SRIOV virtual function usage based on collecting adapter usage statistics for a plurality of resize pole intervals and averaging the collected usage statistics.

20. The system as recited in claim 11, wherein identifying dynamic cost for the SRIOV virtual function (VF) responsive to the identified SRIOV virtual function (VF) usage over a given time interval includes said processor using said management function and said hypervisor for determining dynamic cost based on averaging identified SRIOV virtual function usages over the given time interval.

\* \* \* \* \*